US010774933B2

(12) United States Patent
Zuck et al.

(10) Patent No.: US 10,774,933 B2
(45) Date of Patent: Sep. 15, 2020

(54) VALVE ASSEMBLY

(71) Applicant: Marshall Excelsior Co., Marshall, MI (US)

(72) Inventors: James C. Zuck, Marshall, MI (US); Alex L. Hoffman, Bellevue, MI (US)

(73) Assignee: Marshall Excelsior Co., Marshall, MI (US)

( * ) Notice: Subject to any disclaimer, the term of this patent is extended or adjusted under 35 U.S.C. 154(b) by 552 days.

(21) Appl. No.: 15/407,588

(22) Filed: Jan. 17, 2017

(65) Prior Publication Data

US 2017/0122439 A1     May 4, 2017

Related U.S. Application Data

(60) Continuation of application No. 14/085,417, filed on Nov. 20, 2013, now Pat. No. 9,581,249, which is a
(Continued)

(51) Int. Cl.
*F16K 1/48*     (2006.01)
*F16K 1/10*     (2006.01)
(Continued)

(52) U.S. Cl.
CPC ................. *F16K 1/10* (2013.01); *F16K 1/36* (2013.01); *F16K 1/48* (2013.01); *F16K 1/485* (2013.01);
(Continued)

(58) Field of Classification Search
CPC .......... F16K 15/18; F16K 31/504; F16K 1/10; F16K 1/36; F16K 1/48; F16K 1/485;
(Continued)

(56) References Cited

U.S. PATENT DOCUMENTS 98,688 A    1/1870   Gould
401,647 A   4/1889   Foster
(Continued)

OTHER PUBLICATIONS

Custom made Y-Globe valve, Y-type stop valve straightaway: Aska Japan, www.bb-aska.co.jp/products_page/yGlobeValve/yGlobeValveMainE.htm, May 27, 2008, 3 pages.

*Primary Examiner* — Craig J Price
(74) *Attorney, Agent, or Firm* — Howard & Howard Attorneys PLLC

(57) ABSTRACT

A valve assembly includes a housing having an inlet and an outlet spaced from each other, a first chamber defining the inlet, a second chamber defining the outlet, and a valve seat disposed between the first and second chambers, wherein fluid communicates between the first and second chambers. A valve head is disposed in the housing and moveable relative to the housing between an open position spaced from the valve seat and a closed position engaged with the valve seat. A valve stem is coupled to the valve head for moving the valve head between the open and closed positions. The valve stem is coupled to the valve head and rotatably and reciprocally movable for moving the valve head between the open and closed positions. A retainer plate is coupled to the valve head and a valve seal is disposed between the valve head and the retainer plate. The valve head includes an integrally formed rivet that secures the retainer plate to the valve head, thereby retaining the valve seal to the valve head.

14 Claims, 11 Drawing Sheets

Related U.S. Application Data division of application No. 12/570,763, filed on Sep. 30, 2009, now Pat. No. 8,596,301.

(60) Provisional application No. 61/166,088, filed on Apr. 2, 2009, provisional application No. 61/101,804, filed on Oct. 1, 2008.

(51) Int. Cl.
| | |
|---|---|
| *F16K 1/36* | (2006.01) |
| *F16K 39/02* | (2006.01) |
| *F16K 43/00* | (2006.01) |
| *F16K 15/18* | (2006.01) |
| *F16K 31/50* | (2006.01) |

(52) U.S. Cl.
CPC ............ *F16K 15/18* (2013.01); *F16K 31/504* (2013.01); *F16K 39/024* (2013.01); *F16K 43/008* (2013.01); *Y10T 137/7904* (2015.04); *Y10T 137/86944* (2015.04); *Y10T 137/86968* (2015.04); *Y10T 137/87* (2015.04); *Y10T 137/88022* (2015.04)

(58) Field of Classification Search
CPC ................. F16K 39/024; F16K 43/008; Y10T 137/86592; Y10T 137/86968; Y10T 137/86976; Y10T 137/87008; Y10T 137/87981; Y10T 137/86944; Y10T 137/86936; Y10T 137/87394; Y10T 137/87378; Y10T 137/87555; Y10T 137/7841; Y10T 137/428; Y10T 137/4301; Y10T 137/4322; Y10T 137/4329; Y10T 137/88022; Y10T 137/7904; Y10T 137/87
USPC ............................ 137/630.11, 630.13–630.15, 137/614.16–614.18, 614.11, 630, 629, 137/599.18, 599.16, 512.2, 601.2, 243, 2, 137/43.3, 243.6, 243.7, 43, 243.3; 251/77, 79, 81, 117, 128, 282, 291
See application file for complete search history.

(56) References Cited

U.S. PATENT DOCUMENTS

| | | | |
|---|---|---|---|
| 498,496 A | 5/1893 | Wilkes | |
| 586,616 A | 7/1897 | McElroy | |
| 671,971 A | 4/1901 | Lippold | |
| 981,711 A * | 1/1911 | Steiner | F16K 11/165 137/630.17 |
| 1,013,640 A * | 1/1912 | Bryon | F16K 11/165 137/630.17 |
| 1,033,554 A | 7/1912 | Dickinson | |
| 1,195,429 A | 8/1916 | Acton | |
| 1,226,436 A | 5/1917 | Albrecht | |
| 1,405,192 A | 1/1922 | Eustis | |
| 1,480,873 A | 1/1924 | Wagner | |
| 1,952,430 A | 3/1934 | Glab | |
| 2,096,989 A | 10/1937 | Kohut | |
| 2,290,177 A | 7/1942 | Grant, Jr. | |
| 2,321,095 A | 6/1943 | Mantz | |
| 2,371,351 A | 3/1945 | Paille | |
| 2,403,427 A | 7/1946 | Ludeman | |
| 2,979,083 A * | 4/1961 | Usselmann | F16K 1/526 137/614.11 |
| 3,111,141 A | 11/1963 | Hughes | |
| 3,211,419 A | 10/1965 | Klinger-Lohr | |
| 3,428,090 A | 2/1969 | Hose et al. | |
| 3,438,392 A | 4/1969 | Wilson | |
| 3,497,395 A * | 2/1970 | Kohen | F16K 17/0446 137/860 |
| 3,624,753 A | 11/1971 | Brumm | |
| 3,711,063 A * | 1/1973 | Gibbs | F16K 31/50 137/542 |
| 3,979,105 A | 9/1976 | Pool et al. | |
| 4,177,825 A | 12/1979 | Crawford | |
| 4,199,850 A | 4/1980 | Velan | |
| 5,217,043 A * | 6/1993 | Novakovic | F16K 31/385 137/460 |
| 5,456,285 A | 10/1995 | Lee | |
| 6,581,635 B2 | 6/2003 | Furutate et al. | |
| 6,745,794 B2 | 6/2004 | Gajewski | |
| 7,004,186 B2 | 2/2006 | Ferrel | |
| 7,070,165 B2 | 7/2006 | Jornod | |
| 7,240,694 B2 | 7/2007 | Johnsen et al. | |
| 8,113,240 B2 | 2/2012 | Blanchard et al. | |
| 2004/0200535 A1 | 10/2004 | Carringer et al. | |

\* cited by examiner

VALVE ASSEMBLY

CROSS-REFERENCE TO RELATED APPLICATIONS

This patent application is continuation application of and claims priority to and all benefits of U.S. patent application Ser. No. 14/085,417, filed on Nov. 20, 2013, which is a divisional application of and claims priority to and all benefits of U.S. patent application Ser. No. 12/570,763, filed on Sep. 30, 2009, which claims priority to and all the benefits of U.S. Provisional Patent Application No. 61/101,804 filed on Oct. 1, 2008, and U.S. Provisional Patent Application No. 61/166,088 filed on Apr. 2, 2009, the entire contents of which are expressly incorporated herein by reference.

BACKGROUND OF THE INVENTION

1. Field of the Invention

The present invention relates to a valve assembly, and more specifically, a valve assembly for controlling pressures on opposing sides of the valve assembly prior to opening the valve assembly.

2. Description of the Related Art

Valve assemblies are used for regulating flow in a fluid pipeline system. These valve assemblies comprise a housing having a first chamber, a second chamber, and a valve seat disposed between the first and second chambers. A valve head is disposed in the housing and is moveable relative to the housing between an open position spaced from the valve seat and a closed position engaged with the valve seat.

Valve assemblies are commonly used in a fluid pipeline system having a bidirectional flow. When the valve head is in the closed position, the fluid can exert a pressure against a front portion and/or a back portion of the valve head to create a pressure differential between the front and back portions. In one instance, when a pressure exerted on the back portion is greater than that on the front portion, the pressure on the back portion presses the valve head toward the closed position and impedes the movement of the valve head to the open position. Additionally, the pressure on the back portion may become great enough to cause damage to one or more elements of valve assembly and/or the fluid pipeline system. It would be desirable to have a valve capable of equalizing the pressure between the front and back portions of the valve head or otherwise relieving pressure build-up at the valve head.

In addition, valve assemblies of the prior art have internal components or structure that cause flow restrictions that interfere with the fluid flow. This interference can produce energy loss as fluid flows from an inlet to outlet of the valve assembly thereby decreasing fluid flow performance. It would be desirable to reduce flow restrictions to increase the flow through the valve assembly.

SUMMARY OF THE INVENTION AND ADVANTAGES

A valve assembly comprises a housing having a first chamber, a second chamber, and a valve seat disposed between the first and second chambers. A valve head is disposed in the housing and is moveable relative to the housing between an open position spaced from the valve seat and a closed position engaged with the valve seat. The valve head defines a bore therethrough along an axis. A valve stem is coupled to the valve head for moving the valve head between the open and closed positions. The valve stem is disposed in the bore and is moveable relative to the valve head from a sealed position preventing fluid communication through the bore to an unsealed position allowing fluid communication through the bore for relieving pressure differences between the first chamber and the second chamber when the valve head is in the closed position. An intermediate member is separate from and coupled to the valve seat and the valve head in the bore. The intermediate member is axially fixed to one of the valve stem and the valve head. The other of the valve stem and the valve head defines a travel space with the intermediate member retained in the travel space between the valve stem and the valve head. The travel space is sized larger than the intermediate member along the axis for allowing selective movement of the valve stem relative to the valve head between the sealed and unsealed positions.

The valve assembly advantageously allows for the pressure between the first and second chambers to approach equilibrium before the valve head is moved to the open position. This is beneficial when pressure in the second chamber is greater than that in the first chamber such that the pressure in the second chamber urges the valve head toward the closed position. The valve stem can be moved to the unsealed position to allow the pressures between the first and second chambers to equilibrate prior to moving the valve head to the open position. Because the pressures between the first and second chambers are equilibrated, the force required to move the valve head from the closed position to the open position is reduced.

The present invention also includes a valve assembly comprising a first chamber, a second chamber, and a valve seat disposed between the first and second chambers. A valve head is disposed in the housing and is moveable relative to the housing between an open position spaced from the valve seat and a closed position engaging the valve seat. A valve stem is coupled to the valve head and the housing for moving the valve head relative to the housing between the open and closed positions. The valve head defines a bore extending through the valve head from the first chamber to the second chamber when the valve head is in the closed position. A check valve is disposed in the bore and is configured to move between a sealed position preventing flow through the bore when a pressure difference between the second chamber and the first chamber is below a set value and an unsealed position allowing flow through the bore when the pressure difference is greater than the set value for relieving the pressure difference toward the set value. The valve stem extends into the bore and is engaged with the valve head in the bore with a space defined between the valve stem and the valve head in the bore for allowing flow through the bore between the valve stem and the valve head when the check valve is in the unsealed position.

The check valve advantageously relieves the pressure difference between the second and first chambers. This pressure relief prevents damage to components of the valve assembly and the system to which the valve assembly is connected. This check valve is also beneficial when the pressure in the second chamber urges the valve head toward the closed position. The check valve relieves the pressure difference such that the force required to move the valve head from the open position to the closed position is reduced.

The present invention also includes a valve assembly comprising a housing defining a chamber having an inlet and an outlet spaced from each other along a first axis. The inlet has an inlet diameter and the outlet has an outlet diameter greater than or equal to the inlet diameter. A valve stem is moveably engaged with the housing and extends along a second axis into the chamber. A valve head is disposed in and moveable relative to the housing between an open position and a closed position. The valve head defines a bore extending therethrough along the second axis with the valve stem coupled to the valve head in the bore for moving the valve head along the second axis between the open and closed positions. The housing includes a valve seat disposed in the chamber between the inlet and the outlet with the valve seat extending perpendicular to the second axis. The valve head engages the valve seat in the closed position and is spaced from the valve seat in the open position. The second axis extends at an acute angle relative to the first axis and the housing defines a pocket extending along the second axis for receiving the valve head in the open position to reduce flow restrictions between the inlet and the outlet.

Such a configuration reduces flow restrictions to increase the flow through the valve assembly. Specifically, outlet diameter being greater than or equal to the inlet diameter and the valve head being recessed into the pocket reduces flow restrictions between the inlet and the outlet. The valve seat being perpendicular to the second axis and the second axis extending at an acute angle relative to the first axis also reduces flow restrictions. This configuration ensures that the fluid does not pass through any space in which the cross-sectional area, normal to the flow, is less than the cross-sectional area of the inlet and outlet, which advantageously increases the flow through the valve assembly.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
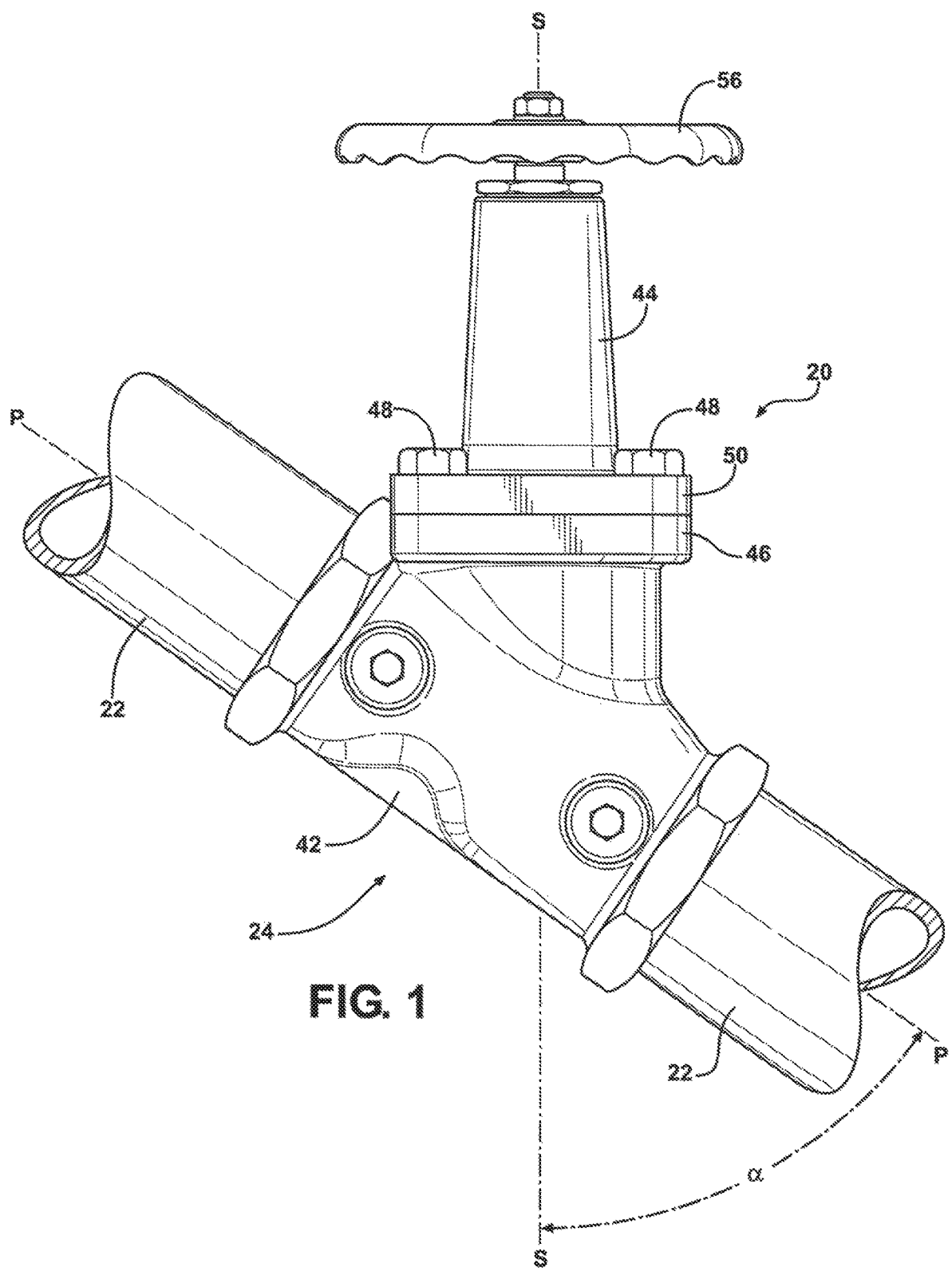
FIG. 1 is side view of a valve assembly.

Referring to the Figures, wherein like numerals indicate like or corresponding parts throughout the several views, a valve assembly is shown generally at 20. The valve assembly 20 is of the type referred to in industry as a globe valve. As shown in FIG. 1, the valve assembly 20 is typically coupled to pipes 22 of a fluid pipe system (not shown) for providing fluid communication between the pipes 22. The fluid pipe system can, for example, handle propane, compressed nitrogen, anhydrous ammonia, petrochemicals, or other types of chemicals. The valve assembly 20 can be used in, for example, bobtail, transport, and bulk plant applications. The pipes 22 to which the valve assembly is coupled can be, for example, 1¼" or larger diameter.

Figure 2:
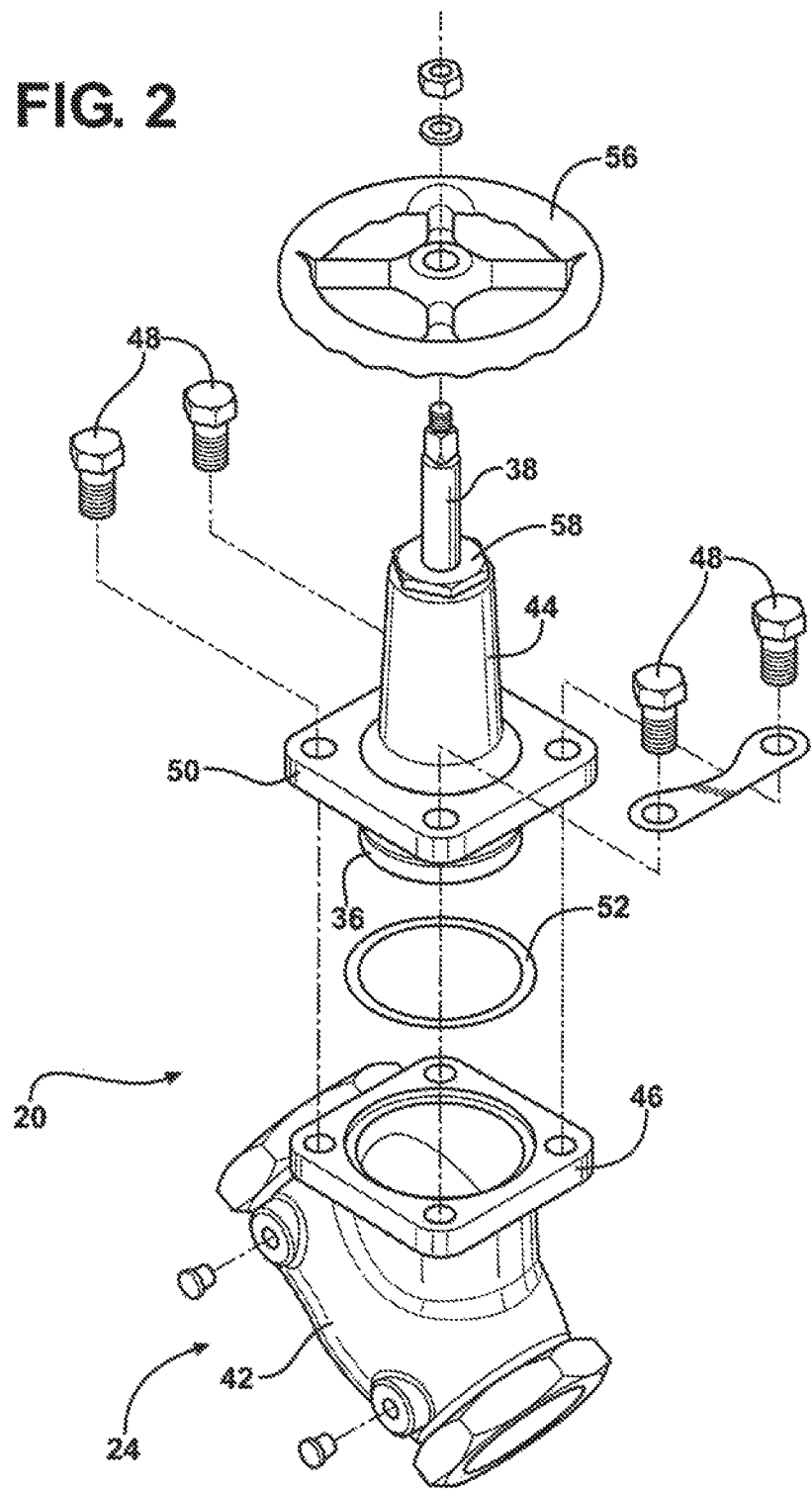
FIG. 2 is a partially exploded view of the valve assembly.
Figure 3:
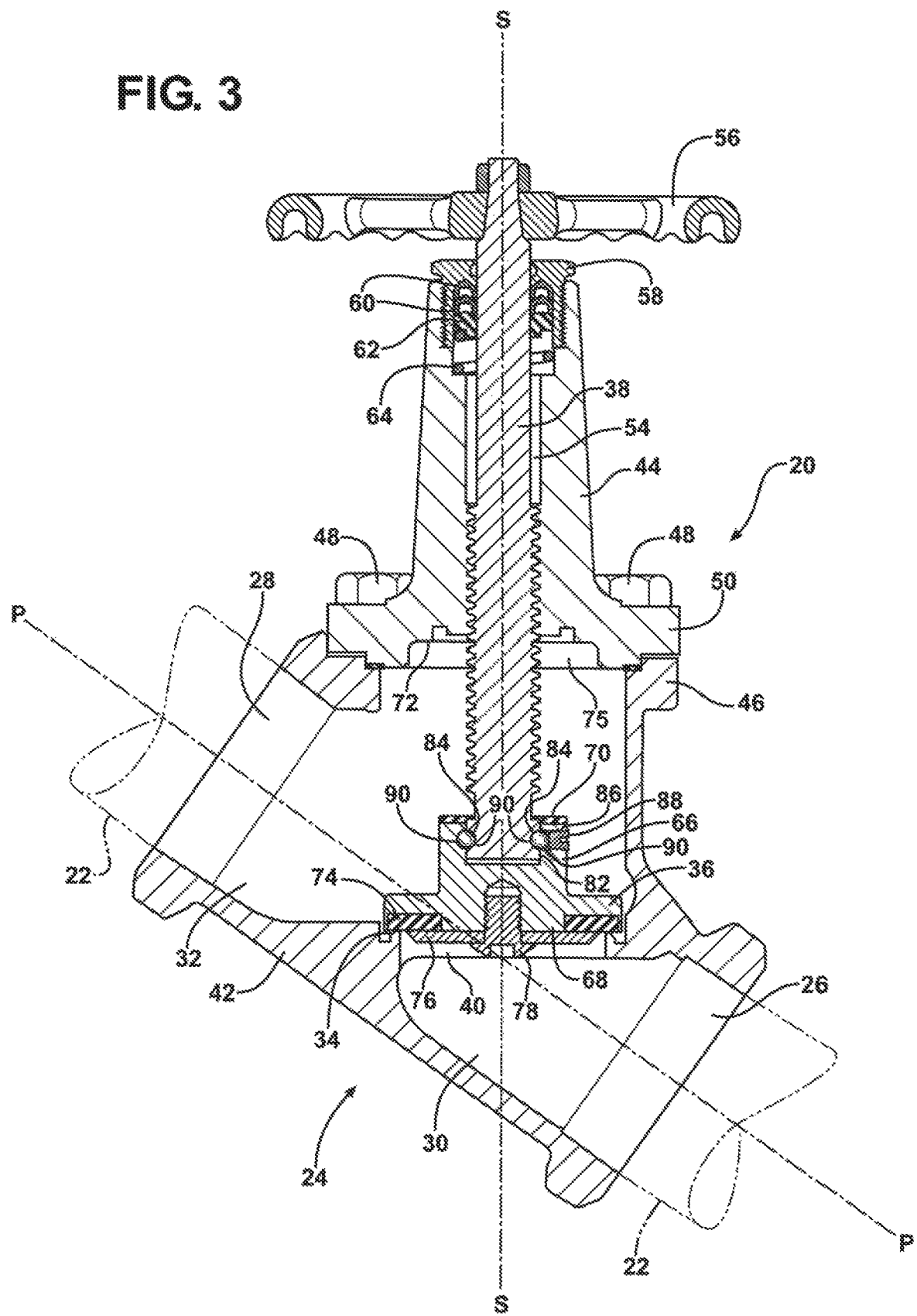
FIG. 3 is a cross-sectional view of a first embodiment of the valve assembly including a valve head in a closed position.
Figure 4:
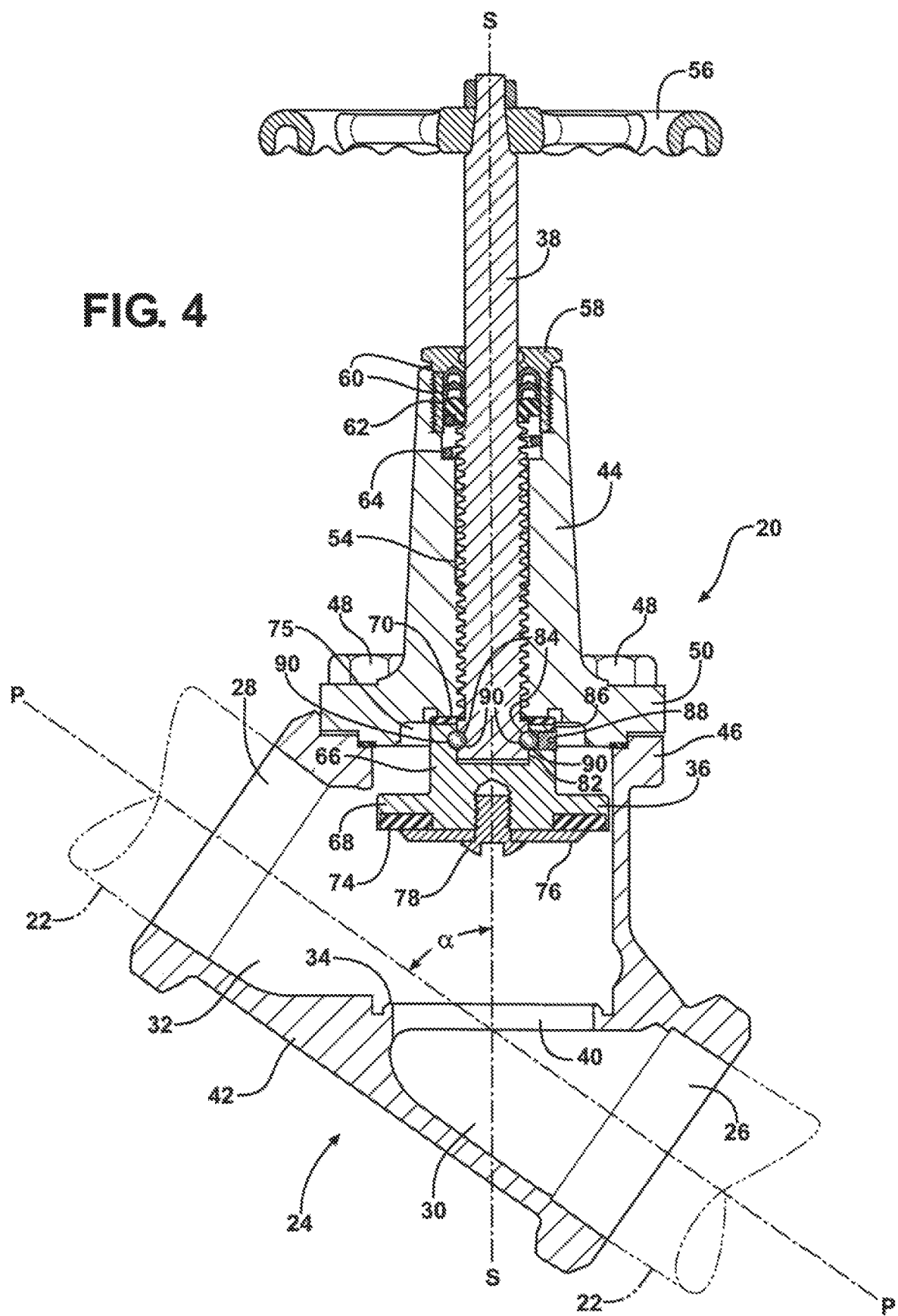
FIG. 4 is a cross-sectional view of the first embodiment of the valve assembly with the valve head in an open position.
Figure 5:
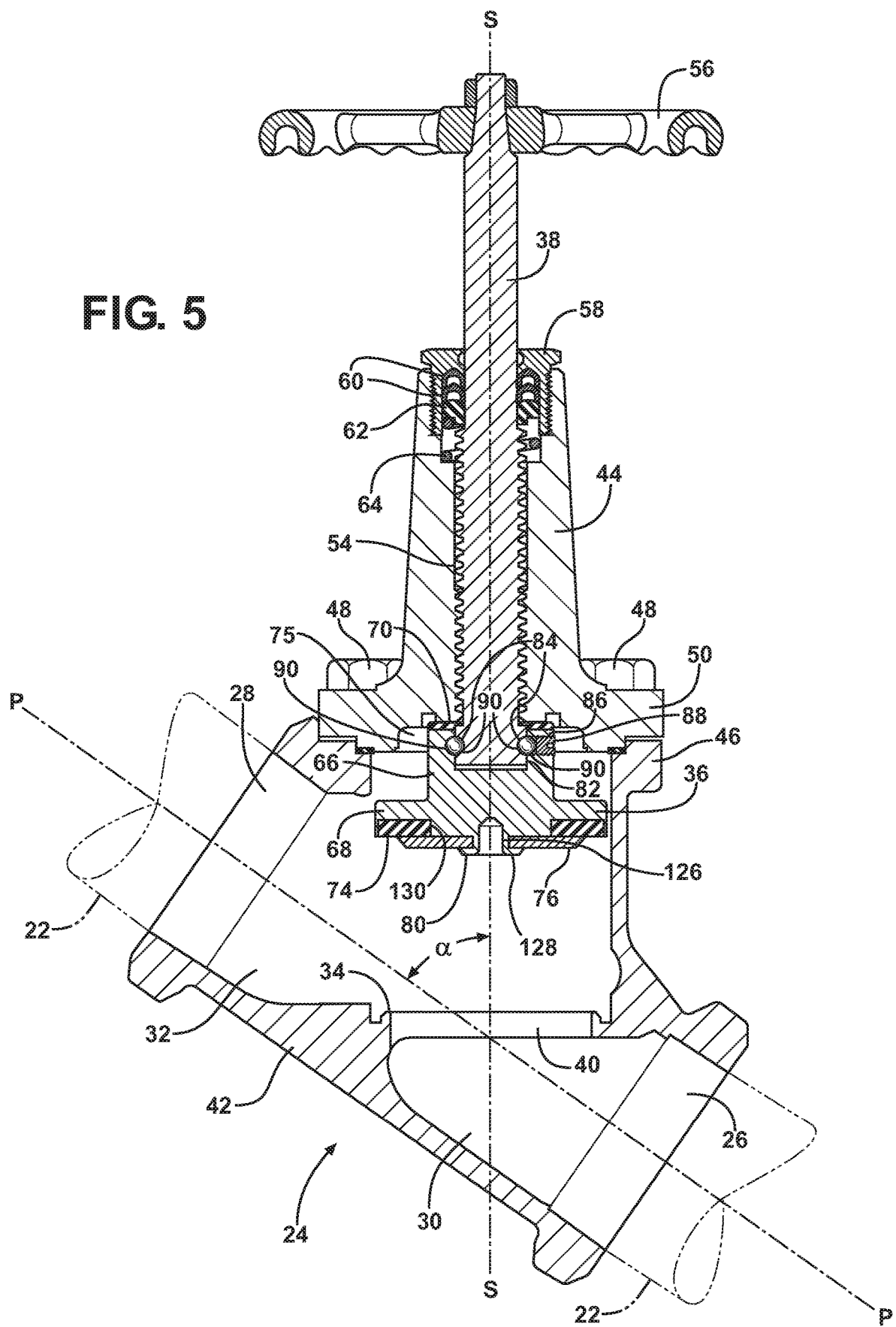
FIG. 5 is a cross-sectional view of the first embodiment with an rivet retaining a seal on the valve head.
Figure 6:
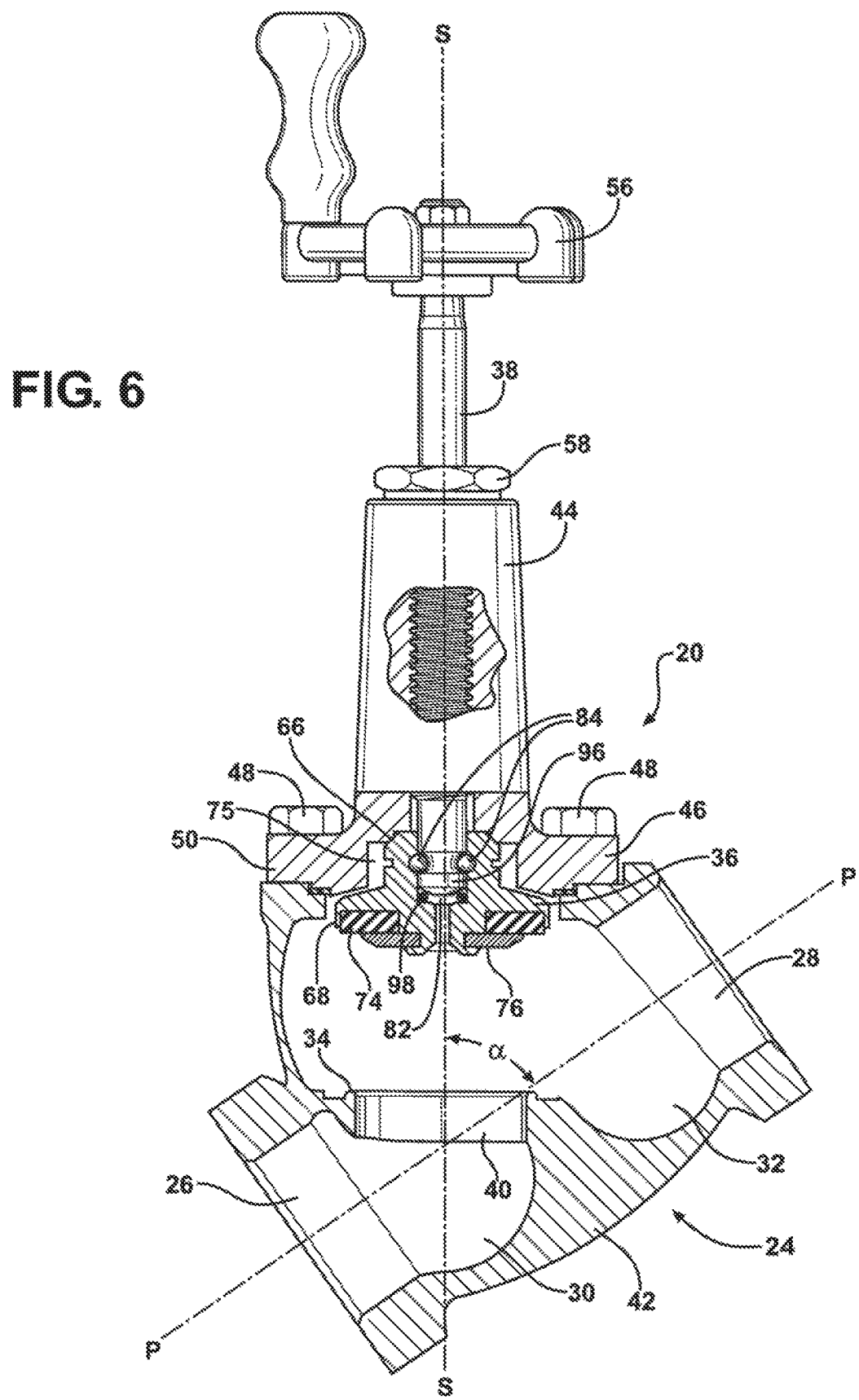
FIG. 6 is a partial cross-sectional view of a second embodiment of the valve assembly with the valve head in an open position.
Figure 7A:
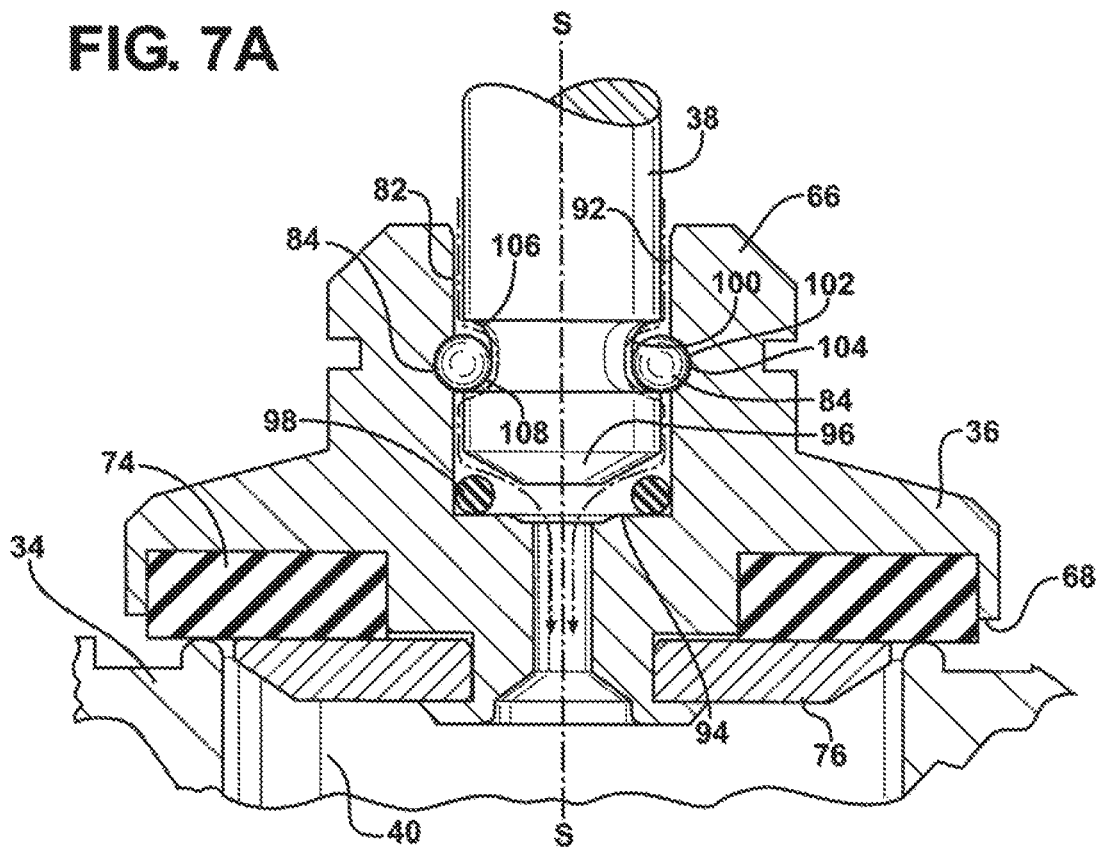
FIG. 7A is a partial cross-sectional view of the second embodiment with the valve head in the closed position and a valve stem in an unsealed position.
Figure 8A:
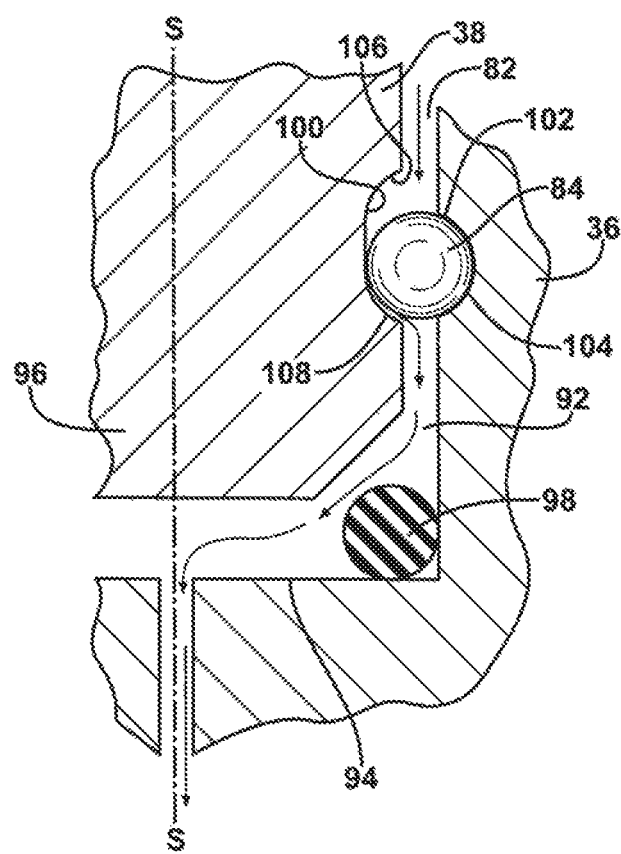
FIG. 8A is a magnified view of a portion of FIG. 7A.
Figure 8B:
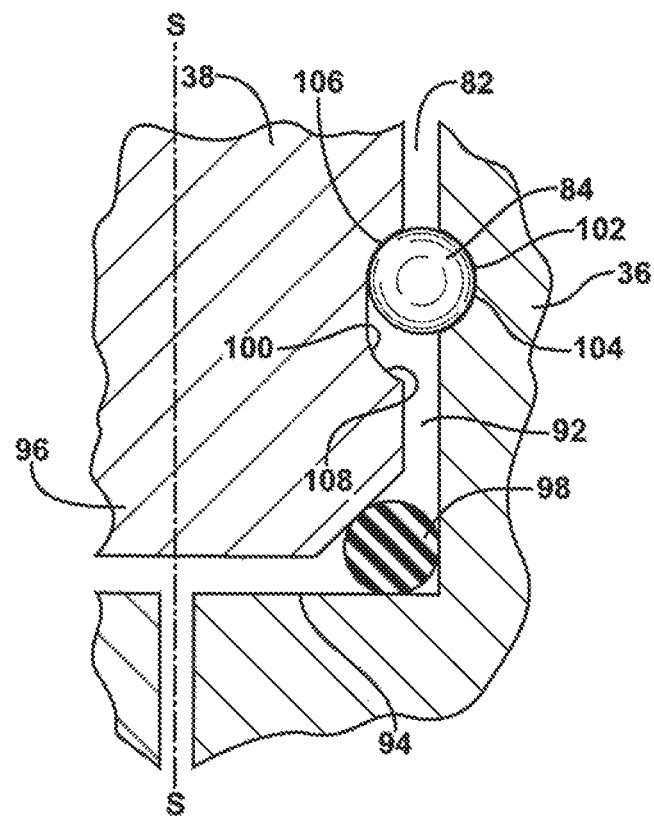
FIG. 8B is a magnified view of a portion of FIG. 7B.
Figure 9:
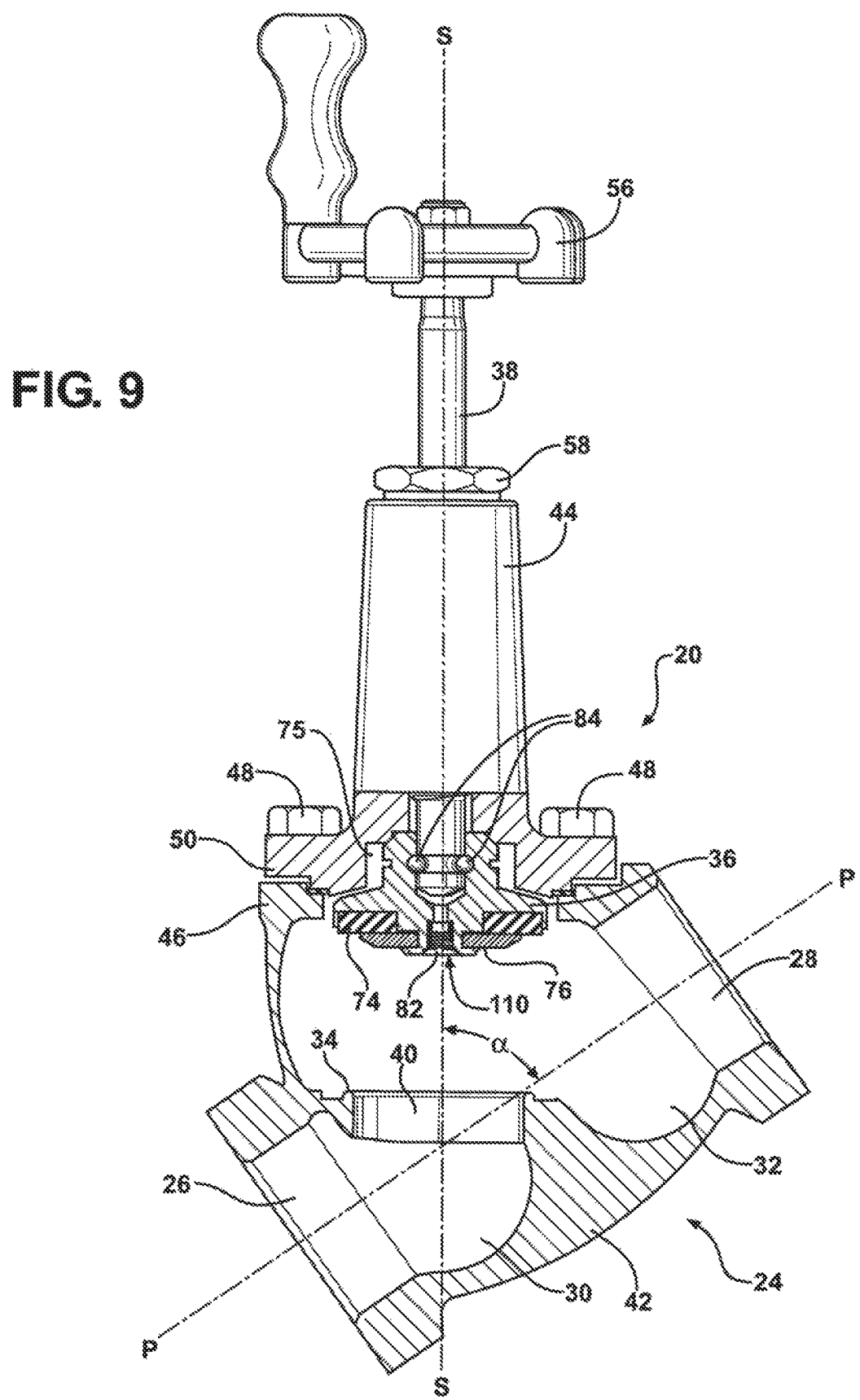
FIG. 9 is a partial cross-sectional view of a third embodiment of the valve assembly with the valve head in the open position.
Figure 10A:
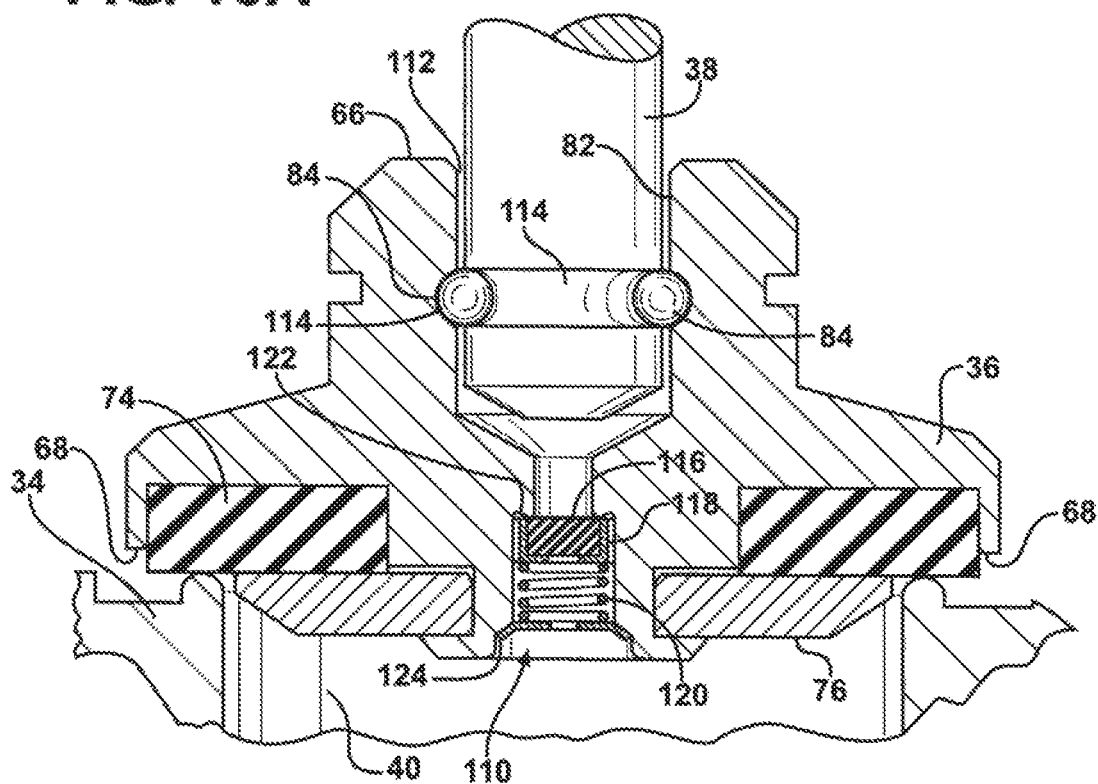
FIG. 10A is a partial cross-sectional view of the third embodiment with the valve head in the closed position and a check valve in a sealed position.
Figure 10B:
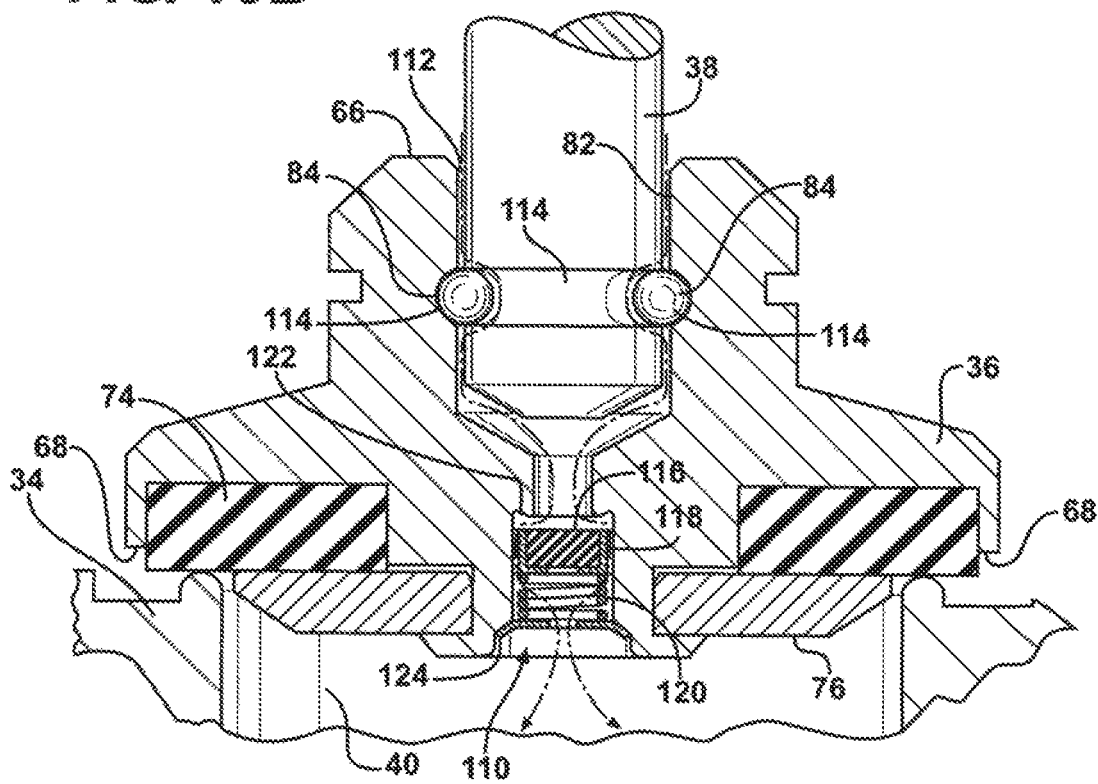
FIG. 10B is a partial cross-sectional view of the third embodiment with the valve head in the closed position and the check valve in an unsealed position.
Figure 11:
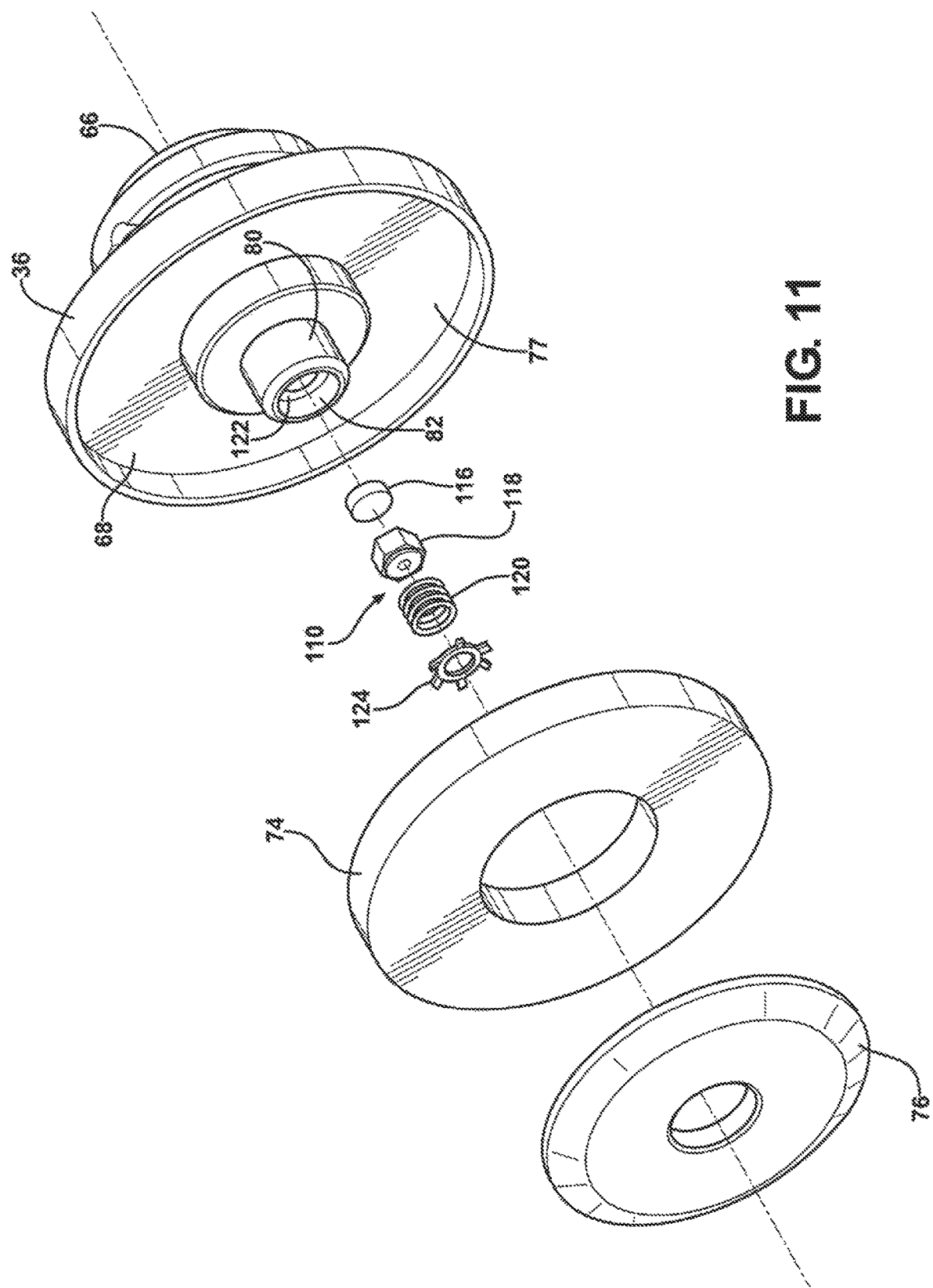
FIG. 11 is an exploded view of the valve head and check valve of the third embodiment.

FIG. 2 depicts a partially exploded view of the valve assembly 20. A first embodiment of the valve assembly 20 is shown in FIGS. 3-5; a second embodiment of the valve assembly 20 is shown in FIGS. 6-8; and a third embodiment of the valve assembly 20 is shown in FIGS. 9-11. Common features among the three embodiments are identified with common numerals. The valve assemblies 20 shown in FIGS. 1-11 can be referred to in industry as globe valves; however, it is to be appreciated that the valve assembly could also be an angle valve that changes the direction of the flow, e.g., by 90°. It is also to be appreciated that selected tolerances shown in FIGS. 1-11 are exaggerated for illustrative purposes only.

Referring to FIGS. 3, 6, and 9, the valve assembly 20 includes a housing 24. The housing 24 defines a chamber having an inlet 26 and an outlet 28. More specifically, the chamber is divided into a first chamber 30 and a second chamber 32 with the first chamber 30 defining the inlet 26 and the second chamber 32 defining the outlet 28. The valve assembly 20 is coupled to the pipes 22 at the inlet 26 and the outlet 28. A valve seat 34 is disposed between the first 30 and second 32 chambers.

The valve assembly 20 includes a valve head 36 disposed in the housing 24 and a valve stem 38 coupled to the valve head 36. The valve head 36 is moveable relative to the housing 24 between an open position and a closed position. The valve stem 38 extends along a stem axis S and the valve stem 38 is moveably coupled to the housing 24 for moving the valve head 36 along the stem axis S between the open and closed positions, as set forth further below. As shown in FIGS. 4-6 and 9, when the valve head 36 is in the open position the valve head 36 is spaced from the valve seat 34 such that the first 30 and second 32 chambers are in fluid communication with each other. As shown in FIGS. 3, 7A-B, and 10A-B, when the valve head 36 is in the closed position, the valve head 36 is engaged with the valve seat 34 to prevent fluid communication between the first 30 and second 32 chambers. The valve stem 38 and the valve head 36 are typically formed of metal such as stainless steel.

The inlet 26 and the outlet 28 are both generally circular in shape and are spaced from each other along a pipe axis P. Each of the inlet 26 and outlet 28 are adapted for coupling to the pipes 22 for fluid communication in the fluid pipe system, e.g., via threaded fitting, press fit, etc. The diameter of the outlet 28 is greater than or equal to the inlet 26 to reduce restrictions of flow from the inlet 26 to the outlet 28. Typically, the diameters of the inlet 26 and the outlet 28 are the same.

As shown in FIGS. 3-6 and 9, the valve seat 34 is disposed centrally about the stem axis S between the first chamber 30 and the second chamber 32. The valve seat 34 defines an opening 40 between the first 30 and second 32 chambers. The opening 40 is defined along both the stem axis S and the pipe axis P. In the closed position, the valve head 36 is seated on and sealed to the valve seat 34 to prevent flow through the opening 40. In the open position, the valve head 36 is spaced from the valve seat 34 to allow flow through the valve seat 34. The valve seat 34 is generally circular in shape, although other suitable shapes may be used such that the valve head 36 can seat against and seal to the valve seat 34.

The opening 40 of the valve seat 34 has a diameter to so as to minimize restriction of flow through the housing 24. Preferably, the opening 40 has a diameter that is at least 75% of the diameter of the inlet 26 and outlet 28. More preferably, the opening 40 has a diameter that is at least 95% of the diameter of the inlet 26 and outlet 28. Most preferably, the opening 40 has the same or larger diameter than the diameter of the inlet 26 and outlet 28 to maximize flow. The housing 24 is constructed so that the fluid does not pass through any space in which the cross-sectional area, normal to the flow, is less than the cross-sectional area of the inlet 26 and outlet 28.

The pipe axis P intersects the stem axis S and is positioned at an acute angle α from the stem axis S. The acute angle α can be from about 10 degrees to about 70 degrees, more preferably from about 20 degrees to about 50 degrees, and most preferably from about 30 degrees to about 40 degrees. In one configuration, the acute angle α is about 35 degrees. The acute angle α is preferably optimized to maximize the flow rate of fluid through the valve assembly 20 by reducing the twists and turns and other flow restrictions that may otherwise impede flow through the valve assembly 20 between the inlet 26 and outlet 28.

With reference to FIG. 2, the housing 24 includes a housing body 42 and a bonnet 44 attached to the housing body 42. The housing body 42 includes a flange 46. A plurality of bolt fasteners 48 couples a lower flange 50 of the bonnet 44 to the flange 46 of the housing body 42. It is to be appreciated that any suitable fasteners may be used. A bonnet gasket 52 is disposed between the flange 46 of the housing body 42 and the lower flange 50 of the bonnet 44 to seal between the housing body 42 and the bonnet 44. The housing body 42 and the bonnet 44 are typically formed of metal such as ductile iron with a powder coat finish.

As shown in FIGS. 3-6 and 9, the valve stem 38 is threadedly coupled to the bonnet 44 of the housing 24 such that rotation of the valve stem 38 relative to the housing 24 moves the valve stem 38 relative to the housing 24 along the stem axis S. Specifically, the bonnet 44 defines a throughbore 54. The valve stem 38 is disposed in the throughbore 54 and is moveably coupled to the throughbore 54. More specifically, the throughbore 54 and the valve stem 38 are threadedly engaged.

A hand wheel 56 is coupled to the valve stem 38 to rotate the valve stem 38 and move the valve head 36 between the open position and the closed position. More specifically, the hand wheel 56 is typically rotated clockwise to move the valve head 36 to the closed position and the hand wheel 56 is rotated counterclockwise to move the valve head 36 to the open position.

A bushing 58 is retained to the upper end of the bonnet 44 by, for example, threaded engagement or press fit engagement. The valve stem 38 extends through the bushing 58. The valve stem 38 is sealed to the bushing 58.

As best shown in FIGS. 3-5, typically, for example, one or more bushing seals 60 seal between the valve stem 38 and the bushing 58 to prevent the escape of fluid therebetween. The bushing seals 60 are generally annular u-shaped cups, however, any other suitable configuration may be used without departing from the nature of the present invention.

A seal expander 62 is disposed between the bushing 58 and the valve stem 38. An expander spring 64 is disposed in the throughbore 54 and biases the seal expander 62 toward the upper end of the bonnet 44, thereby biasing the bushing seals 60 toward the upper end of the bonnet 44. An end of the seal expander 62 is generally tapered to press against the bushing seals 60 due to the bias of the expander spring 64 such that the seal expander spreads the bushing seals 60 into simultaneous contact with the bushing 58 and the valve stem 38. The bushing seals 60 are stacked so that each bushing 58 seal forces the adjacent bushing 58 seal to spread and contact the bushing 58 and the valve stem 38.

The valve head 36 includes a back portion 66 having a first diameter and a front portion 68, having a second diameter larger than the first diameter. As shown in FIGS. 3 and 4, a rear seal 70 can be disposed on a rear surface of the back portion 66 to prevent fluid flow through the throughbore 54 of the bonnet 44. The lower flange 50 of the bonnet 44 has a sealing surface 72 for sealing against the valve head 36 when the valve head 36 is in the open position. When the valve head 36 is in the open position, the rear seal 70 abuts and seals against the sealing surface 72 to prevent fluid from flowing into the throughbore 54. The rear seal 70 may be formed of a suitable sealing material such as nitrile, PTFE (polytetrafluoroethylene), or Viton® and can be attached to the back portion by any suitable adhesive, being press fit in a channel, etc.

As shown in FIGS. 3-6 and 9, the bonnet 44 defines a rear pocket 75. When moved to the open position, the valve head 36 is seated within the rear pocket 75 and is recessed away from the flow path of fluid through the housing body 42 to reduce flow restrictions. Recall that the fluid preferably does not pass through any space in which the cross-sectional area, normal to the flow, is less than the cross-sectional area of the inlet 26 and outlet 28. The movement of the valve head 36 into the rear pocket 75 in the open position aids in accomplishing such a configuration by further recessing the valve head 36 out of the flow path along the pipe axis P.

A valve seal 74 can be disposed in an annular recess 77 (see FIG. 11) defined in the front portion 68 of the valve head 36 to seal against the valve seat 34 when the valve head 36 is in the closed position. When the valve head 36 is in the closed position, the valve seal 74 abuts the valve seat 34 to prevent fluid flow from the first chamber 30 into the second chamber 32. The valve seal 74 may be formed of a suitable sealing material such as, for example, nitrile, Teflon®, or Viton®.

A retainer plate 76 is coupled to the valve head 36 to retain the valve seal 74 in position. For example, as shown in FIG. 4, a threaded fastener 78 extends through the retainer plate 76 into the valve head 36 to secure the valve seal 74 to the valve head 36. Alternatively, as shown in FIG. 5, the valve head 36 includes an integrally formed rivet 80 that secures the retainer plate 76 to the valve head 36, thereby retaining the valve seal 74. In other words, during manufacturing the rivet 80 is simply a cylindrical shaped protrusion (see FIG. 11) that is flattened at its distal end once the retainer plate 76 is positioned over the rivet 80 to form an enlarged head 128, i.e., the rivet 80 includes a post 126 extending from the front portion 68 of the valve head 36 and the enlarged head 128 is spaced from the front portion 68, as shown in FIGS.

9-10B. The valve seal 74 includes a hole 130 that receives the post 126 between the enlarged head 128 and the front portion 68, as shown in FIGS. 9-11. For example, the rivet 80 can be formed by using an orbital forming process such that the integrally formed rivet cooperates with the retainer plate 76 to secure the retainer plate 76. It is to be appreciated that the term orbital forming refers to a technique for deforming a material to a desired shape. Additionally, it is to be appreciated that the retainer plate 76 may be secured to the valve head 36 using other methods known to one skilled in the art without deviating from the nature of the present invention.

As shown in FIGS. 3-10B, the valve head 36 defines a bore 82 that receives the valve stem 38 with the valve stem 38 coupled to the valve head 36 in the bore 82. Specifically, the valve stem 38 extends into the bore 82 and intermediate members 84 for example ball bearings, are disposed between the valve stem 38 and the valve head 36 in the bore 82. The intermediate members 84 are separate from and coupled to the valve head 36 and the valve stem 38, i.e., the intermediate members 84 are formed separately from the valve head 36 and the valve stem 38 and are introduced between the valve head 36 and the valve stem 38 as separate units. The intermediate members 84 engage the valve stem 38 and the valve head 36 in the bore 82 to retain the valve head 36 in the bore 82.

The intermediate members 84 roll relative to the valve stem 38 and/or the valve head 36 such that the valve head 36 can typically swivel 360° about the valve stem 38. When the valve head 36 contacts the valve seat 34 as the valve stem 38 is rotated toward the closed position, the valve head 36 stops rotating and the valve stem 38 is further tightened toward the closed position to ensure proper sealing between the valve head 36 and the valve seat 34. This configuration eliminates scouring of the valve seat 34 by the valve head 36 when the valve head 36 is moved to the closed position thereby increasing the reliability and durability of the valve assembly 20.

The intermediate members 84 are typically spherical; however, it is to be appreciated that the intermediate members 84 can be any shape such that the intermediate members 84 retain the valve head 36 and the valve stem 38 together in a swiveling configuration. The intermediate members 84 are typically formed of metal; however, it is to be appreciated that the intermediate members 84 can be formed of any type of rigid material that maintains shape during swiveling of the valve head 36 relative to the valve stem 38.

The valve head 36 defines an aperture 86, as shown in FIGS. 3 and 4, for introduction of the intermediate members 84 to between the valve head 36 and the valve stem 38. The aperture 86 is sized to receive the intermediate members 84. A fastener, such as a set screw 88, retains the intermediate members 84 between the valve head 36 and the valve stem 38. With the set screw 88 removed from the aperture 86, the intermediate members 84 are introduced between the valve head 36 and the valve stem 38 through the aperture 86. The set screw 88 is subsequently inserted into the aperture 86. The set screw 88 is typically threadedly engaged with the valve head 36 in the aperture 86.

In the first embodiment, as shown in FIGS. 3-5, the valve stem 38 and the valve head 36 define corresponding races 90. The corresponding races 90 have a shape and size corresponding to the intermediate members 84. The intermediate members 84 are retained between the valve stem 38 and the valve head 36 in the corresponding races 90 for engaging the valve stem 38 to the valve head 36. Typically, the corresponding races 90 are each continuous around the circumference of the bore 82; however, it is to be appreciated that one of the corresponding races 90 can be discontinuous, i.e., a plurality of discontinuous races spaced from each other about the circumference of the bore.

The intermediate members 84 in the corresponding races 90 retain the valve head 36 in position along the stem axis S relative to the valve stem 38. The intermediate members 84 roll along the corresponding races 90 such that the valve head 36 swivels about the valve stem 38. This configuration with the valve stem 38 extending into the bore 82 and engaging the valve head 36 in the bore 82 allows for the valve head 36 to be recessed further into the rear pocket 75. This compact construction advantageously decreases the restriction of flow through the housing body 42 thereby increasing the flow through the housing body 42.

Figure 7B:
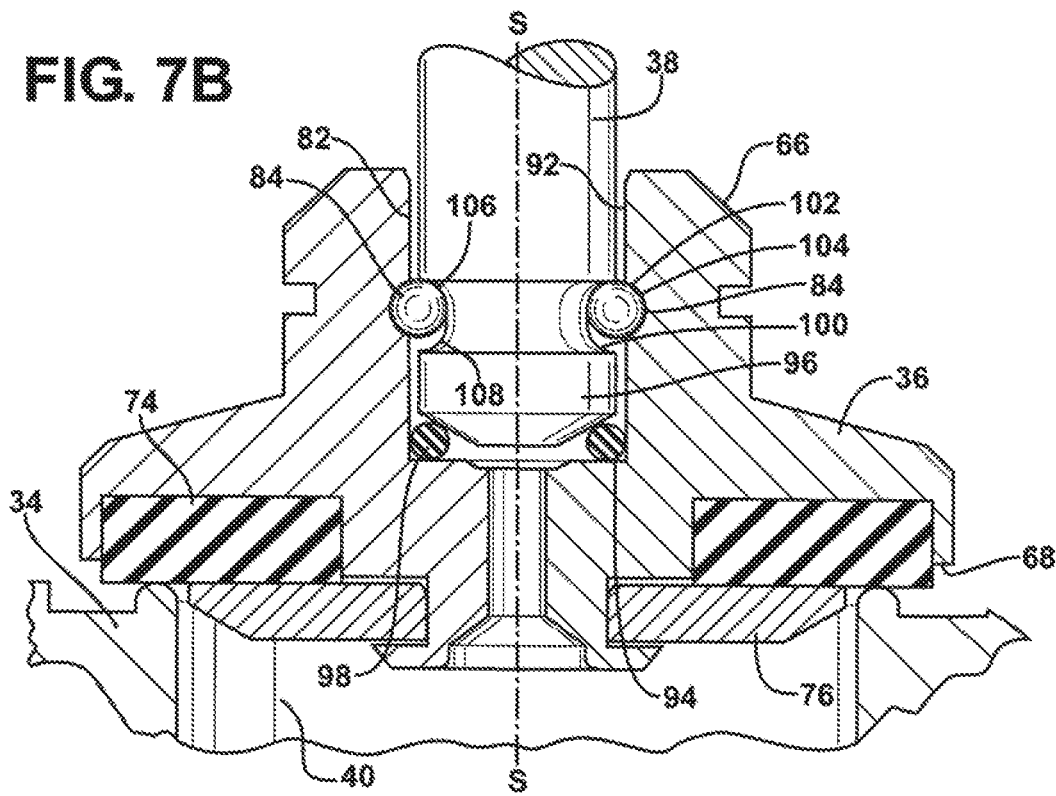
FIG. 7B is a partial cross-sectional view of the second embodiment with the valve head in the closed position and the valve stem in the sealed position.

The second embodiment is described in the following paragraphs. In the second embodiment, as shown in FIGS. 6-7B, the bore 82 extends along the stem axis S through the valve head 36 such that, when the valve head 36 is in the closed position, the bore 82 extends from the first chamber 30 to the second chamber 32.

The valve stem 38 selectively allows fluid communication between the first 30 and second 32 chambers through the bore 82 to relieve pressure differences between the second 32 and first chambers. Specifically, the valve stem 38 is disposed in the bore 82 and is moveable along the stem axis S relative to the valve head 36 from a sealed position to an unsealed position. In the sealed position, as shown in FIGS. 7B and 8B, the valve stem 38 seals to the valve head 36 and blocks the bore 82 to prevent fluid communication through the bore 82. When the valve stem 38 is in the unsealed position, as shown in FIGS. 7A and 8A, the bore 82 is open to allow fluid communication through the bore 82, i.e., the first 30 and second 32 chamber 32 are in fluid communication with each other through the bore 82. A space 92 is defined between the valve head 36 and the valve stem 38 to allow fluid communication in the unsealed position.

With reference to FIGS. 6-8B, the valve head 36 defines a ledge 94 in the bore 82. A bore seal 98 is disposed in the bore 82 between the ledge 94 and the valve stem 38. As set forth further below, an end 96 of the valve stem 38 contacts the bore seal 98 and seals against the bore seal 98 when the valve stem 38 is in the sealed position and is spaced from the bore seal 98 when the valve stem 38 is in the unsealed position. The bore seal 98 is formed of a suitable sealing material such as, for example, nitrile, Teflon®, Viton®, or the like. The end 96 of the valve stem 38 has a chamfered configuration for cooperating with the bore seal 98.

The intermediate members 84 are fixed along the stem axis S relative to one of the valve stem 38 and the valve head 36 with the other of the valve stem 38 and the valve head 36 defining a travel space 100. The intermediate members 84 are retained in the travel space 100 between the valve stem 38 and the valve head 36. The travel space 100 typically is continuous about the circumference of the valve stem 38, i.e., an elongated groove. Alternatively, the travel space 100 can be discontinuous, i.e., the valve stem 38 can define a plurality of travel spaces spaced from each other about the circumference of the valve stem 38.

In the embodiment shown, the intermediate members 84 are fixed relative to the valve head 36 and the valve stem 38 defines the travel space 100. The travel space 100 is spaced from the end 96 of the valve stem 38. The travel space 100 extends circumferentially about the valve stem 38.

The valve head 36 defines a depression 102 with the intermediate members 84 fixed along the stem axis S in the depression 102. The depression 102 can be, for example, an opposing race 104 opposing the travel space 100. However, it is to be appreciated that the depression 102 can be any sort of depression capable of fixing the intermediate members 84 along the stem axis S relative to the travel space 100.

Typically, the diameter of the intermediate members 84 generally approximates the size of the opposing race 104 such that the intermediate members 84 are fixed along the stem axis S relative to the opposing race 104. However; it is to be appreciated that the opposing race 104 may be slightly larger than the diameter of the intermediate members 84 as long as the width of the travel space 100 along the stem axis S is greater than the width of the opposing race 104 along the stem axis S such that the intermediate members 84 are fixed relative to the opposing race 104 as the intermediate members 84 move along the travel space 100, as set forth further below.

The travel space 100 is longer along the stem axis S than the opposing race 104. Preferably, the width of the travel space 100 along the stem axis S is at least 1% greater, more preferably at least 10% greater than the width of the opposing race 104 along the stem axis S. For example, the width of the travel space 100 along the stem axis S is 0.08 inches larger than the width of the opposing race 104 along the stem axis S.

The travel space 100 is sized larger than the intermediate members 84 along the stem axis S for allowing selective movement of the valve stem 38 between the sealed and unsealed positions. In other words, the intermediate members 84 move relative to the travel space 100 along the stem axis S when the valve stem 38 is moved along the stem axis S between the sealed and unsealed positions.

Specifically, a first wall 106 and a second wall 108 are disposed along the travel space 100. The first 106 and second 108 walls are spaced from each other along the stem axis S and oppose each other about the travel space 100. The first wall 106 engages the intermediate members 84 when the end 96 contacts the bore seal 98 for preventing excessive compression of the bore seal 98 by the end 96. The second wall 108 engages the intermediate members 84 when the valve stem 38 moves toward the unsealed position for moving the valve head 36 to the open position. The intermediate members 84 are spaced from the second wall 108 when the valve stem 38 is in the sealed position and is spaced from the first wall 106 when the valve stem 38 is in the unsealed position. Typically, the first 106 and second 108 walls correspond in shape to the intermediate members 84.

The valve assembly 20 of the second embodiment operates as follows. Rotation of the valve stem 38 relative to the housing 24 moves the valve stem 38 between the sealed and unsealed positions and moves the valve head 36 between the open and closed positions. When the valve head 36 is in the closed position, the first wall 106 engages the intermediate members 84 such that the valve stem 38 is in the sealed position with the bore seal 98 disposed between and sealing to the end 96 of the valve stem 38 and the ledge 94 of valve head 36, as shown in FIGS. 7B and 8B.

To move the valve head 36 to the open position, the hand wheel 56 is rotated counter-clockwise thereby traversing the valve stem 38 back up through the bonnet 44. Because the travel space 100 is larger than the intermediate members 84 along the stem axis S, the valve stem 38 moves from the sealed position to the unsealed position, i.e., the end 96 of the valve stem 38 separates from the bore seal 98, before the second wall 108 engages the intermediate members 84. As such, the end 96 of the valve stem 38 separates from the bore seal 98 before the valve head 36 is moved away from the valve seat 34, as shown in FIGS. 7A and 8A. As a result, a pressure difference that may exist between the second chamber 32 and the first chamber 30 equalizes as the valve stem 38 separates from the bore seal 98 before the valve head 36 is moved away from the valve seat 34. Arrows in FIGS. 7A and 8A illustrate the flow of fluid from the second chamber 32 to the first chamber 30 to reduce the pressure differential therebetween. Typically the bore seal 98 is uncompressed in less than one full rotation of the hand wheel 56. One benefit of reducing or eliminating the pressure differential between the second 32 and first 30 chambers is that a force required to rotate the hand wheel 56 is reduced since the pressures in the second 32 and first 30 chambers approach one another or equalize. This is particularly beneficial when the pressure of the second chamber 32 is substantially greater than the pressure of the first chamber 30.

As the valve stem 38 is further rotated counter-clockwise, the valve stem 38 continues to move along the stem axis S relative to the valve head 36 until the intermediate members 84 engage the second wall 108. Once the intermediate members 84 engage the second wall 108, further counter-clockwise rotation of the valve stem 38 results in movement of the valve head 36 from the closed position toward the open position, i.e., the valve head 36 separates from the valve seat 34. The valve stem 38 is rotated counter-clockwise further to move the valve head 36 to the open position recessed in the rear pocket 75 of the bonnet 44, as shown in FIG. 6.

To move the valve head 36 back to the closed position, the hand wheel 56 is rotated clockwise thereby traversing the valve stem 38 and the valve head 36 toward the valve seat 34. As the valve head 36 contacts the valve seat 34, the valve head 36 ceases to rotate and the hand wheel 56 is rotated clockwise further to tightly seal the valve head 36 against the valve seat 34 in the closed position. In the closes position, the intermediate members 84 engage the first wall 106. As set forth above, the distance between the end 96 of the valve stem 38 and the first wall 106 is sized such that the end 96 properly seals against the bore seal 98 without damaging the bore seal 98 by overcompression.

The third embodiment is described in the following paragraphs. In the third embodiment, as shown in FIGS. 9-10B, the bore 82 extends through the valve head 36 from the inlet 26 to the outlet 28 when the valve head 36 is in the closed position. An integrated back check valve, hereinafter referred to as check valve 110, is disposed in the bore 82 and is configured to move between a sealed position and an unsealed position. In the sealed position, as shown in FIG. 10A, the check valve 110 prevents flow through the bore 82 when a pressure difference between the inlet 26 and the outlet 28 is below a set value. In the unsealed position, as shown in 10B, the check valve 110 allows flow through the bore 82 when the pressure difference is greater than the set value for relieving the pressure difference. A space 112 is defined between the valve stem 38 and the valve head 36 and also between the intermediate members 84 in the bore 82 for allowing flow through the bore 82 between the valve stem 38 and the valve head 36 when the check valve 110 is in the unsealed position. This configuration with the valve stem 38 engaging the valve head 36 in the bore and with the check valve 110 disposed in the bore is an advantageously compact construction thereby reducing flow restriction when the valve head 36 is in the open position.

The intermediate members 84 are disposed in the bore 82 between the valve stem 38 and the valve head 36 with the intermediate members 84 fixed relative to the valve stem 38 and the valve head 36 along the stem axis S. The valve stem 38 and the valve head 36 define corresponding races 114 in the bore 82 with the intermediate members 84 retained in the corresponding races 114 between the valve stem 38 and the valve head 36 such that the valve head 36 swivels relative to the valve stem 38. The corresponding races 114 extend circumferentially about the valve stem 38. A diameter of each of the intermediate members 84 generally approximates the diameter defined by the corresponding races 114 but still allowing each of the intermediate members 84 to freely traverse in the corresponding races 114.

An exploded view of the check valve 110 is shown in FIG. 11. The check valve 110 includes a plug 116 sealing to the valve head 36 in the bore 82 in the sealed position, as shown in FIG. 10A, and spaced from the valve head 36 in the unsealed position, as shown in FIG. 10B. The check valve 110 includes a plug holder 118 defining a cavity for receiving the plug 116. A spring 120 is coupled to the plug 116 by abutting the plug holder 118 to urge the plug 116 toward the sealed position, as set forth further below. The plug 116 is preferably formed of a suitable sealing material such as nitrile, Teflon®, Viton®, or the like.

The bore 82 changes diameter to define a check valve seat 122. The check valve 110 is disposed in the bore 82 adjacent the check valve seat 122. A circumference of the plug holder 118 has a polygon configuration and the bore has a cylindrical shape for defining flow paths between the plug holder 118 and the valve head 36 for providing fluid communication through the bore 82 when the check valve 110 is in the unsealed position.

A spring retainer 124 is disposed in the bore 82 with a spring 120 disposed between the spring retainer 124 and the plug holder 118. The spring 120 is typically a coil spring 120 formed of metal such as stainless steel. The spring retainer 124 engages the valve head 36 in the bore 82 such that the spring retainer 124 retains the spring 120 in the bore 82 and supports the spring 120. The spring retainer 124 may be formed of metal or non-metal materials. The spring retainer 124 can be, for example, press fit, welded or otherwise fixed to the valve head 36.

The check valve 110 operates as follows. When the check valve 110 is in the sealed position and the pressure difference between the second chamber 32 and the first chamber 30 exceeds the set value, the pressure on the plug 116 overcomes opposing force providing by the spring 120 in combination with any pressure in the first chamber 30 such that the spring 120 compresses and the plug 116 moves away from the check valve seat 122 to allow communication between the first 30 and second 32 chambers through the bore 82. As a result, the pressures of the first 30 and second 32 chambers begin to equilibrate until the pressure difference reaches the set value. At that time, the spring 120 overcomes the pressure on the plug 116 to bias the relief plug 116 back against the check valve seat 122. Preferably, the set value is greater than 75 pounds per square inch (psi), more preferably between 75 and 100 psi. It is to be appreciated that the "set value" is a predetermined value that be changed by changing components of the check valve 110 such as, for example, altering the spring constant of the spring 120.

Such a configuration advantageously alleviates pressure in a downstream fluid pipe 22 that has a closed downstream valve (not shown). For instance, the pipe 22 may have a main relief valve set to open at a relief pressure, e.g., 400 psi or greater. When the valve assembly 20 is closed and the downstream valve is closed, a closed spaced is defined between the check valve 110 and the downstream valve. If this space is heated, the fluid pressure increases. Without the check valve 110, if the pressure in the downstream pipe 22 increases beyond the relief pressure, fluid in the downstream pipe is lost through the main relief valve to the atmosphere. The check valve 110 of the present invention can be incorporated into such a system to prevent such loss of fluid to the atmosphere by relieving the excess pressure in the closed space to the upstream pipe or container.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A valve assembly comprising:
a housing having an inlet and an outlet spaced from each other, a first chamber defining said inlet, a second chamber defining said outlet, and a valve seat disposed between said first and second chambers, wherein fluid communicates between said first and second chambers;
a valve head disposed in said housing and moveable relative to said housing between an open position spaced from said valve seat and a closed position engaged with said valve seat;
a valve stem coupled to said valve head and being rotatably and reciprocally movable for moving said valve head between said open and closed positions;
a retainer plate coupled to said valve head;
a valve seal disposed between said valve head and said retainer plate; and
wherein said valve head includes an integrally formed rivet that secures said retainer plate to said valve head, thereby retaining said valve seal to said valve head.

2. The valve assembly as set forth in claim 1 wherein said rivet has an enlarged head at a distal end of said rivet.

3. The valve assembly as set forth in claim 2 wherein said valve head includes a front portion, said valve seal being disposed adjacent said front portion.

4. The valve assembly as set forth in claim 3 wherein said rivet includes a post extending from said front portion of said valve head and said enlarged head extends from said post and is spaced from said front portion of said valve head.

5. The valve assembly as set forth in claim 4 wherein said retainer plate includes a hole to receive said post and said retainer plate is disposed between said enlarged head and said front portion.

6. The valve assembly as set forth in claim 1 wherein said rivet is formed by an orbital forming process such that said rivet cooperates with said retainer plate to secure said retainer plate to said valve head.

7. A valve assembly comprising:
a housing having a first chamber, a second chamber, and a valve seat disposed between said first and second chambers;
a valve head disposed in said housing and moveable relative to said housing between an open position spaced from said valve seat and a closed position engaged with said valve seat, said valve head having a front portion and a rear portion;
a valve stem coupled to said rear portion of said valve head and being rotatably and reciprocally movable for moving said valve head between said open and closed positions;
wherein said valve head includes a post extending from said front portion and integrally formed with the valve head;

a valve seal including a hole receiving said post and being disposed adjacent said front portion;

a retainer plate having a hole to receive said post and being disposed adjacent said valve seal; and wherein said post has an enlarged head at a distal end of said post spaced from said front portion to secure said retainer plate to said valve head, thereby retaining said valve seal to said valve head.

8. A method of assembling a valve assembly, said method comprising the steps of:

provide a housing having an inlet and an outlet spaced from each other, a first chamber defining the inlet, a second chamber defining the outlet, and a valve seat disposed between the first and second chambers, wherein fluid communicates between the first and second chambers;

disposing a valve head in the housing and being moveable relative to the housing between an open position spaced from the valve seat and a closed position engaged with the valve seat;

coupling a valve stem to the valve head and being rotatably and reciprocally movable for moving the valve head between the open and closed positions;

disposing a valve seal adjacent the valve head;

disposing a retainer plate adjacent the valve seal; and forming a rivet integrally with the valve head and securing the retainer plate to the valve head, thereby retaining the valve seal to the valve head.

9. The method as set forth in claim 8 including the step of extending a post of the rivet from a front portion of the valve head.

10. The method as set forth in claim 9 including the step of receiving the post in a hole of the valve seal.

11. The method as set forth in claim 10 including the step of receiving the post in a hole of the retainer plate.

12. The method as set forth in claim 11 including the step of enlarging the post at a distal end of said post to form an enlarged head.

13. The method as set forth in claim 8 including the step of forming the rivet by an orbital forming process such that the rivet cooperates with the retainer plate to secure the retainer plate to the valve head.

14. A method of assembling a valve assembly, said method comprising the steps of:

providing a housing having an inlet and an outlet spaced from each other, a first chamber defining the inlet, a second chamber defining the outlet, and a valve seat disposed between the first and second chambers, wherein fluid communicates between the first and second chambers;

disposing a valve head in the housing and being moveable relative to the housing between an open position spaced from the valve seat and a closed position engaged with the valve seat, the valve head having a front portion and a rear portion;

coupling a valve stem to the rear portion of the valve head and being rotatably and reciprocally movable for moving the valve head between the open and closed positions;

extending a post from a front portion of the valve head;

disposing a valve seal having a hole adjacent the front portion of the valve head such that the post extends through the hole of the valve seal;

disposing a retainer plate having a hole adjacent the valve seal such that the post extends through the hole of the retainer plate; and enlarging the post at a distal end of the post to form an enlarged head by orbital forming to form a rivet integrally with the valve head and securing the retainer plate to the valve head, thereby retaining the valve seal to the valve head.

* * * * *